(12) United States Patent
Almishari

(10) Patent No.: US 10,113,771 B2
(45) Date of Patent: Oct. 30, 2018

(54) CARBON DIOXIDE-BASED HEATER

(71) Applicant: Ibrahim Almishari, Durrat al Bahrain (BH)

(72) Inventor: Ibrahim Almishari, Durrat al Bahrain (BH)

( * ) Notice: Subject to any disclaimer, the term of this patent is extended or adjusted under 35 U.S.C. 154(b) by 1043 days.

(21) Appl. No.: 14/508,753

(22) Filed: Oct. 7, 2014

(65) Prior Publication Data

US 2015/0345831 A1 Dec. 3, 2015

Related U.S. Application Data

(60) Provisional application No. 62/005,439, filed on May 30, 2014.

(51) Int. Cl.
| | |
|---|---|
| *F24J 2/00* | (2014.01) |
| *F24J 2/30* | (2006.01) |
| *F24S 20/25* | (2018.01) |
| *F24S 10/40* | (2018.01) |
| *F24S 10/30* | (2018.01) |
| *F28F 13/12* | (2006.01) |
| *F24S 80/20* | (2018.01) |

(52) U.S. Cl.
CPC ............ *F24S 20/25* (2018.05); *F24S 10/30* (2018.05); *F24S 10/40* (2018.05); *F24S 80/20* (2018.05); *F28F 13/125* (2013.01); *Y02E 10/44* (2013.01)

(58) Field of Classification Search
CPC ............................ F23F 13/125; F24J 2/0015
USPC ........................................................ 126/652
See application file for complete search history.

(56) References Cited

U.S. PATENT DOCUMENTS

| | | | | |
|---|---|---|---|---|
| 1,754,232 | A | * | 4/1930 | Fisher .................. F24H 3/0411 126/90 A |
| 3,919,998 | A | | 11/1975 | Parker |
| 4,081,934 | A | | 4/1978 | Franz |
| 4,135,490 | A | | 1/1979 | Soleau, Jr. |

(Continued)

FOREIGN PATENT DOCUMENTS

| | | |
|---|---|---|
| DE | 3013614 | 10/1981 |
| DE | 3228364 | 2/1984 |

(Continued)

OTHER PUBLICATIONS

Al-Kayiem, Hussain H. et al., Study on the Thermal Accumulation and Distribution Inside a Parked Car Cabin, American Journal of Applied Sciences, Perak, Malaysia, 2010, pp. 784-789.

(Continued)

*Primary Examiner* — Avinash Savani
*Assistant Examiner* — Rabeeul Zuberi
(74) *Attorney, Agent, or Firm* — Conley Rose PC

(57) ABSTRACT

There is provided in a first form of an illustrative embodiment a method. The method includes providing a quantity of carbon dioxide in gaseous form within an interior volume of an vessel and contacting the carbon dioxide gas with a heat exchanger disposed within the interior volume of the vessel. The vessel is exposed to solar radiation, wherein the carbon dioxide absorbs radiation in one or more vibration bands of the carbon dioxide, the absorbed radiation obtained from the solar radiation. Heat within the first quantity of carbon dioxide produced by collisional thermalization of the absorbed radiation is transferred, via the heat exchanger, to a heat transfer medium within the heat exchanger and in fluid communication with an external environment of the vessel.

4 Claims, 6 Drawing Sheets

(56) References Cited

U.S. PATENT DOCUMENTS

| | | | |
|---|---|---|---|
| 4,142,511 A * | 3/1979 | Doughty | F24S 10/70 |
| | | | 126/654 |
| 4,161,170 A * | 7/1979 | Nicolaisen | F24S 80/52 |
| | | | 126/271.1 |
| 4,244,354 A | 1/1981 | Williams | |
| 4,316,434 A | 2/1982 | Bailey | |
| 4,323,054 A | 4/1982 | Hummel | |
| 6,066,187 A | 5/2000 | Jenson | |
| 8,991,182 B2 * | 3/2015 | McAlister | F03G 6/00 |
| | | | 126/567 |
| 2010/0089387 A1 * | 4/2010 | Roseberry | F24D 3/005 |
| | | | 126/563 |
| 2011/0308249 A1 * | 12/2011 | Mandelberg | F24J 2/42 |
| | | | 60/641.15 |
| 2012/0222373 A1 | 9/2012 | Bouesnard et al. | |
| 2013/0000633 A1 * | 1/2013 | Morber | F24J 2/055 |
| | | | 126/652 |
| 2013/0040079 A1 | 2/2013 | Caliaro et al. | |

FOREIGN PATENT DOCUMENTS

| | | |
|---|---|---|
| DE | 202009006250 | 7/2009 |
| EP | 0039401 | 11/1981 |
| FR | 2325887 | 4/1977 |
| WO | 79000276 | 5/1979 |
| WO | 84002729 | 7/1984 |
| WO | 2012025073 | 3/2012 |

OTHER PUBLICATIONS

Abd-Fadeel, Waleed A. et al., Temperature Variations in a Parked Car Exposed to Direct Sun During Hot and Dry Climates, International Journal of Automobile Engineering Research & Development, vol. 3, Issue 1, Mar. 2013, pp. 75-80.

Dadour, I.R. et al., Temperature Variations in a Parked Car, Forensic Science International, Dec. 9, 2009, 15 pages.

Korukçu, M. Özgün et al., The usage of IR thermography for the temperature measurements inside an automobile cabin, International Communications in Heat and Mass Transfer, vol. 36, 2009, pp. 872-877.

Quadri, Zeya Ahmad et al., Computational Analysis of Thermal Distribution Within Passenger Car Cabin, International Journal on Theoretical and Applied Research in Mechanical Engineering, vol. 2, Issue 2, 2013, pp. 119-125.

* cited by examiner

CARBON DIOXIDE-BASED HEATER

CROSS-REFERENCE TO RELATED APPLICATIONS

The present application claims the benefit of U.S. Provisional Application Ser. No 62/005,439 filed May, 30, 2014 by Ibrahim Almishari titled "Carbon Dioxide-Based Heater" which is incorporated herein by reference as if reproduced in its entirety

BACKGROUND

Current methods and systems for heating gases and liquids may require large amounts of energy and be costly. Thus, any method and system which provides effective heating power is advantageous.

BRIEF DESCRIPTION OF THE DRAWINGS

For a detailed description of various embodiments, reference will now be made to the accompanying drawings in which.

NOTATION AND NOMENCLATURE

Figure 1:
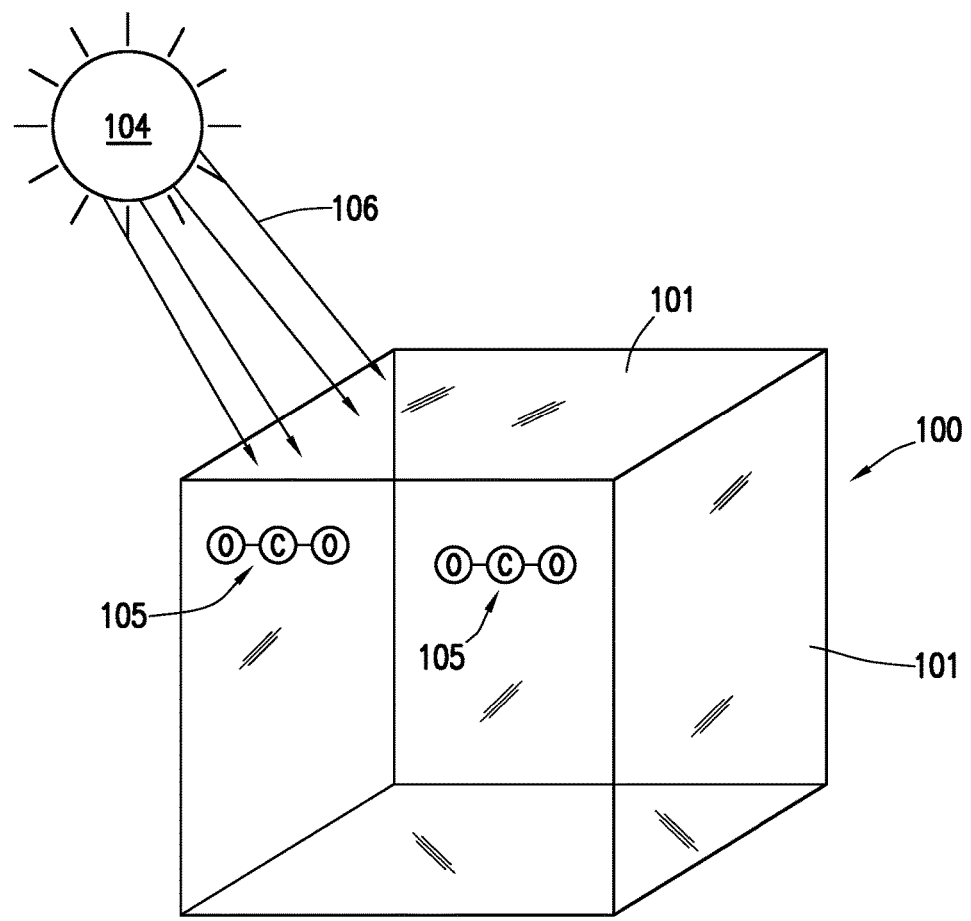
FIG. 1 shows a perspective view of a carbon dioxide heater in accordance with at least some embodiments.

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Standard conditions" means a standard temperature and pressure as commonly used in the chemical arts and defined by IUPAC, namely, a standard temperature and pressure of 273.1 5K and 100 kPa, respectively.

"Exemplary" means serving as an example, instance, or "illustration." An embodiment described herein as "exemplary" is not necessarily to be construed as preferred or advantageous over other embodiments.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to a carbon dioxide-based heater. Described in high level terms, a transparent vessel containing carbon dioxide absorbs infrared radiation from the sun. The thermalized radiation may be used to heat other gases and/or liquids by way of a heat exchanger coupled to the vessel. The specification first turns to a high level overview of the properties of carbon dioxide.

Infrared (IR) radiation is a type of electromagnetic radiation having longer wavelengths than the wavelengths of visible light. At least some of the energy emitted from the sun enters the Earth's atmosphere in the form of infrared radiation. Carbon dioxide absorbs infrared radiation in three bands of wavelengths: 2.7 micrometers ($\mu m$), 4.3 $\mu m$, and 15 $\mu m$. Molecules of carbon dioxide absorb the sun's emitted infrared (IR) radiation and, without going into the intermediate details of the science of absorption, the energy received causes the carbon dioxide molecule to vibrate. The vibrations may subsequently be de-excited by collisions between the carbon dioxide molecules or between carbon dioxide molecules and other gas molecules, to the extent such molecules are present. The vibrational energy may thus be converted to translational motion of the molecules (i.e, to get hot). In this way, the absorption of the infrared energy enables carbon dioxide to effectively trap heat.

FIG. 1 shows a perspective view of a carbon dioxide-based heater in accordance with at least some embodiments. In particular, FIG. 1 shows vessel 100 having walls 101 comprised of a material that is, in at least some embodiments, transparent to infrared radiation, and more particularly, infrared radiation in the one or more of the aforementioned absorption bands of carbon dioxide. In at least some other embodiments, the material comprising the walls of vessel 100 may be transparent to radiation in the visible portion of the electromagnetic spectrum in addition to or in lieu of transparency in the infrared. Although FIG. 1 shows the vessel 100 as being cubical in shape, the shape of the vessel is immaterial, as long as the vessel has an internal volume 103 which enables the containment of gaseous carbon dioxide. For example, the vessel 100 may be in the shape of a cube, a cylinder, a cone, a sphere, or any other contemplated shape having an internal volume.

The vessel 100 is comprised of a transparent material which enables infrared radiation to pass through the walls of the vessel and into the interior volume 103. Although the word "transparent" is used for the simplicity of discussion, the material may also be translucent, or may be comprised of any material which enables the passage of infrared radiation, particularly infra-red radiation in one or more of the vibrational bands of carbon dioxide, and/or visible radiation into the vessel 100. For example, in one embodiment, the vessel 100 may be comprised of infrared-transparent glass. In another embodiment, the vessel 100 may be comprised of an infrared-transparent plastic material. In yet another embodiment, albeit expensive, the vessel may be comprised of an infrared-transparent material such as diamond. Other materials may include fused silica, multispectral zinc sulfide and calcium fluoride. Further, as described above, in at least some embodiments, the material may be a glass, plastic or other material that is transparent in the visible portion of the spectrum in addition to or in lieu of the infrared portion of the electromagnetic spectrum. Furthermore, the size of the vessel 100 varies dependent upon the application of the carbon dioxide-based heater, and thus the disclosure is not limited as to the size, and the vessel 100 may be of any size and volume. For example, in some embodiments, the size of the vessel 100 may be about one cubic meter in volume, and in some other embodiments, the size may be in the range of about 10 to 100 cubic meters in interior volume. As stated earlier, these sizes are exemplary and not limiting.

Regardless of the composition of the vessel 100 or the size, the vessel 100 contains carbon dioxide. The volume of carbon dioxide may vary between applications, and thus any volume of carbon dioxide may be contemplated. Furthermore, although carbon dioxide may have a liquid state or a solid state, for purposes of this disclosure, it is assumed the carbon dioxide is in a gaseous state (i.e., the container 100 and the carbon dioxide are approximately at standard conditions, prior to any heating thereof by electromagnetic radiation obtained from the solar radiation). For example, at standard conditions, the density of the carbon dioxide contained within the box may be approximately 1.98 kg/m^3, or approximately 1.67 times the density of earth's air. The disclosure is not limited, however, by the state of the carbon dioxide, nor is the disclosure limited by to standard conditions. In other words, the disclosure contemplates a variation in temperature and pressure of both the vessel 100 and the contained carbon dioxide. Indeed, as radiation is absorbed and transformed into thermal energy, the temperature of the carbon dioxide will be expected to increase.

As discussed previously, the sun 104 emits radiation 106 into the earth's atmosphere. Radiation 106 may include infrared and other radiation such as visible radiation. In at least one embodiment, the radiation 106 strikes the vessel 100 and passes through the transparent material into the interior volume 103 of the vessel 100. The radiation strikes the carbon dioxide molecules contained within the vessel 100 (and shown illustratively as the dumbbell-shaped figures 105). The carbon dioxide molecules, in turn, thermalize the energy from the radiation, as described above. In order to transfer the heat trapped within the carbon dioxide molecules to a different medium, other mechanisms may be disposed within or coupled to the vessel 100, as shown in FIG. 2.

Figure 2:
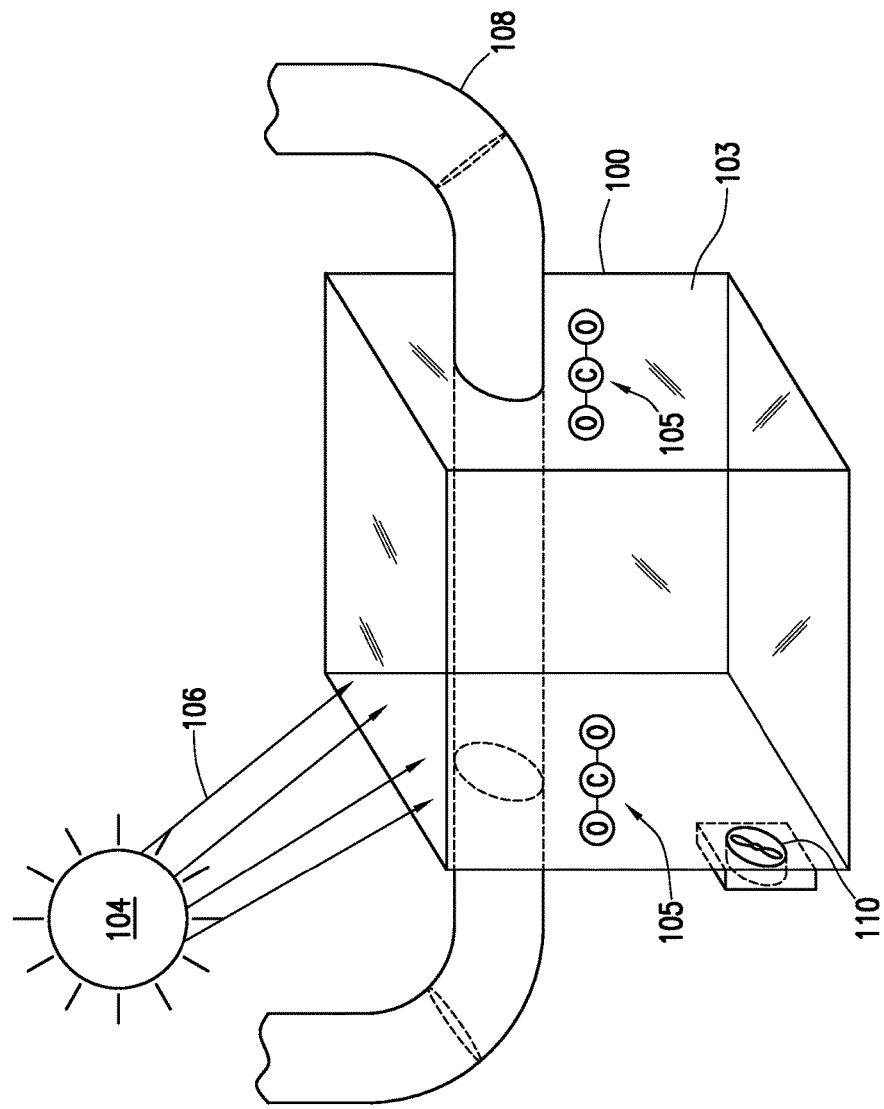
FIG. 2 shows a perspective view of a carbon dioxide heater in accordance with at least some embodiments.

FIG. 2 shows an example heat exchanger 108 is disposed partially within the vessel 100 in accordance with some embodiments. The heat exchanger 108 may be any of a plurality of types of heat exchangers. In one embodiment, the heat exchanger 108 may be a shell and tube heat exchanger. In another embodiment, the heat exchanger 108 may be plate heat exchanger. In yet another embodiment, the heat exchanger 108 may be a plate and shell heat exchanger or a plate fin heat exchanger.

The heat exchanger 108 enables heat transfer from the carbon dioxide to another medium which itself may serve as a heat transfer medium to convey the absorbed heat to the environment external to vessel 100. For example, heat may be transferred from the heated carbon dioxide contained within vessel 100 to water flowing through the heat exchanger 108. In this example, water may flow through the heat exchanger 108 (shown as a simple pipe in FIG. 2). As the water flows through the heat exchanger and passes through the heated carbon dioxide, the water absorbs some of the heat trapped in the carbon dioxide. The water may then be in fluid communication with the environment outside the vessel to transport heat thereto as more fully described below. Although water has been used as an exemplary heat transfer medium, other materials may be used, such as aqueous solutions of ethylene or propylene glycol which may have a higher boiling point that water alone. Additionally, the heat transfer medium may be pressurized to further raise its boiling point. The foregoing are exemplary and not limiting and any suitable heat transfer medium known in the art may be used in alternative embodiments.

As the carbon dioxide releases some of the heat and begins to cool, the density of the carbon dioxide increases, causing the cooler gas to sink towards the bottom of the vessel 100. The movement of cooled and heated carbon dioxide within the vessel 100 may create convection currents which create a flow of carbon dioxide about the heat exchanger.

In at least some embodiment, a fan mechanism 110 may be coupled to the carbon dioxide heater in such a way as to more rapidly and efficiently enable movement of the carbon dioxide within the vessel 100. The operation of fan mechanism 110 may be likened to the operation of the fan in a convection oven. The movement of the carbon dioxide within the vessel enables the cooler carbon dioxide to convert the absorbed the infrared radiation to heat, while the warmer carbon dioxide transfers heat by way of the heat exchanger. Nevertheless, in at least some instances, the natural convection of the carbon dioxide may be sufficient, and fan mechanism 110 may be switched off.

Returning to heat exchanger 108, the heat transfer medium therein may be used to further transfer the heat picked up from the carbon dioxide within vessel 100 to a consumer of the heat. For example, the transferred heat may be further exchanged with a heating, ventilation and air conditioning system (HVAC) to heat the interior space of a structure such as the living space of a residence, or to provide hot water thereto. In another example, the transferred heat may be used in a steam generator which may further be employed to generate electrical power. In still other examples, the transferred heat may be used to generate electricity directly using a thermoelectric, or Seebeck, device. Although the foregoing may suggest terrestrial applications, there is nothing that limits the embodiments of the carbon-dioxide based heater thereto. For example, embodiments of the carbon-dioxide based heater may be used to provide energy to a manned or unmanned installation on the surface of the moon. In such an embodiment, the absence of a lunar atmosphere means that there is no attenuation of the incoming solar infrared radiation by residual carbon dioxide in the atmosphere.

Figure 3:
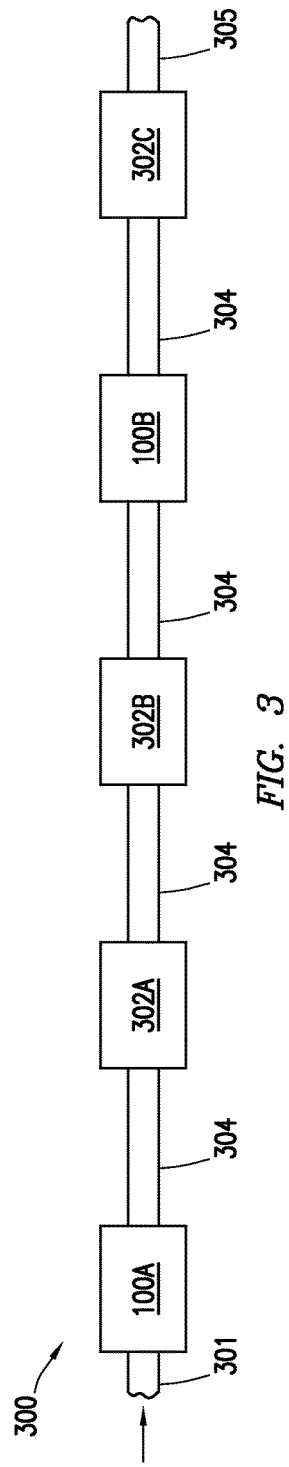
FIG. 3 shows a block diagram of a carbon dioxide heater system in accordance with at least some embodiments.

Further, once the heat transfer medium has transferred the heat carried thereby to the consumer of the heat, the heat transfer medium may be recirculated back through vessel 100 to be re-heated. In other words, a circulating system may be contemplated in at least some embodiments. In still other embodiments, as illustrated in FIG. 3, a circulating system 300 including serially connected vessels having one or more heat consumers fluidly coupled therebetween. For example, in system 300 the heat transfer medium may enter a vessel 100A at an entrance port 301 and be heated as previously described. The heat transfer medium may then be transferred via a fluid conduit 304 to a heat consumer 302A, and then to a second heat consumer 302B which may consume heat at a lower temperature than heat consumer 302A. The heat transfer medium may be transferred via a second fluid conduit 304 to a second vessel 100B and be reheated, and then to a third heat consumer 302C. Then the thermal transfer medium may be returned to vessel 100A via exit port 305. In this way a plurality of heat consumers may be supplied while maintaining temperature differentials within the heat transfer medium within a desired range. Moreover, the various vessels may be sized differently depending on the amount of heat consumed by different heat consumers being supplied.

Figure 4:
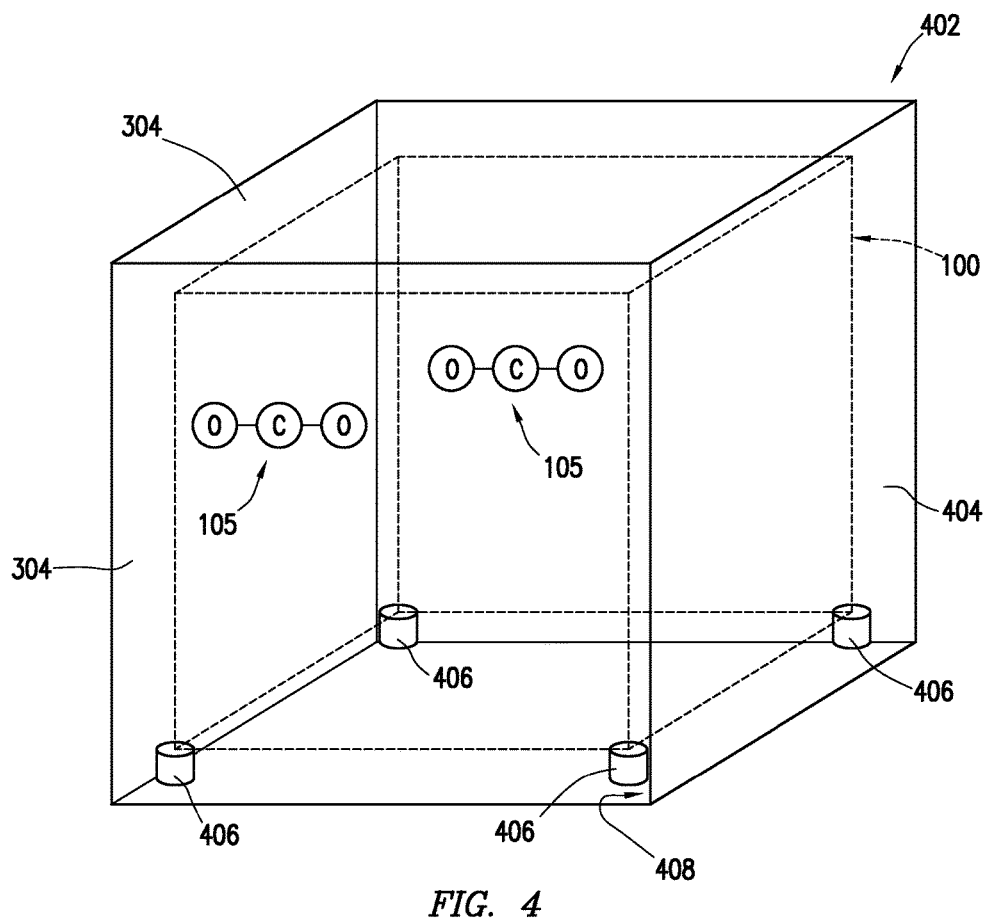
FIG. 4 shows a perspective view of a carbon dioxide heater in accordance with at least some embodiments.

To mitigate against heat loss, in at least some embodiments, vessel 100 may be enclosed in an outer vessel 402, as shown in FIG. 4. To more easily distinguish the two vessels, carbon dioxide containing vessel 100 is depicted with dashed lines. Outer vessel 302 may be comprised of the same materials as vessel 100. Interior space 404 between vessel 100 and outer vessel 302 may be pumped free of air or other gases to create vacuum therein. Further, vessel 100 may be mounted on thermally insulating standoffs 406 to mitigate against heat loss by conduction to base 408 of outer vessel 402 and then to the external environment. Further, in at least some embodiments, to further mitigate against radiative heat loss during periods of darkness or other low insolation interior space 404 may be filled with a thermally insulating, infrared opaque material, a fluid, for example, that may be pumped into interior space 404, and then drained during daylight, say. For ease of illustration, heat exchanger 108 has been omitted from FIG. 4.

Figure 5:
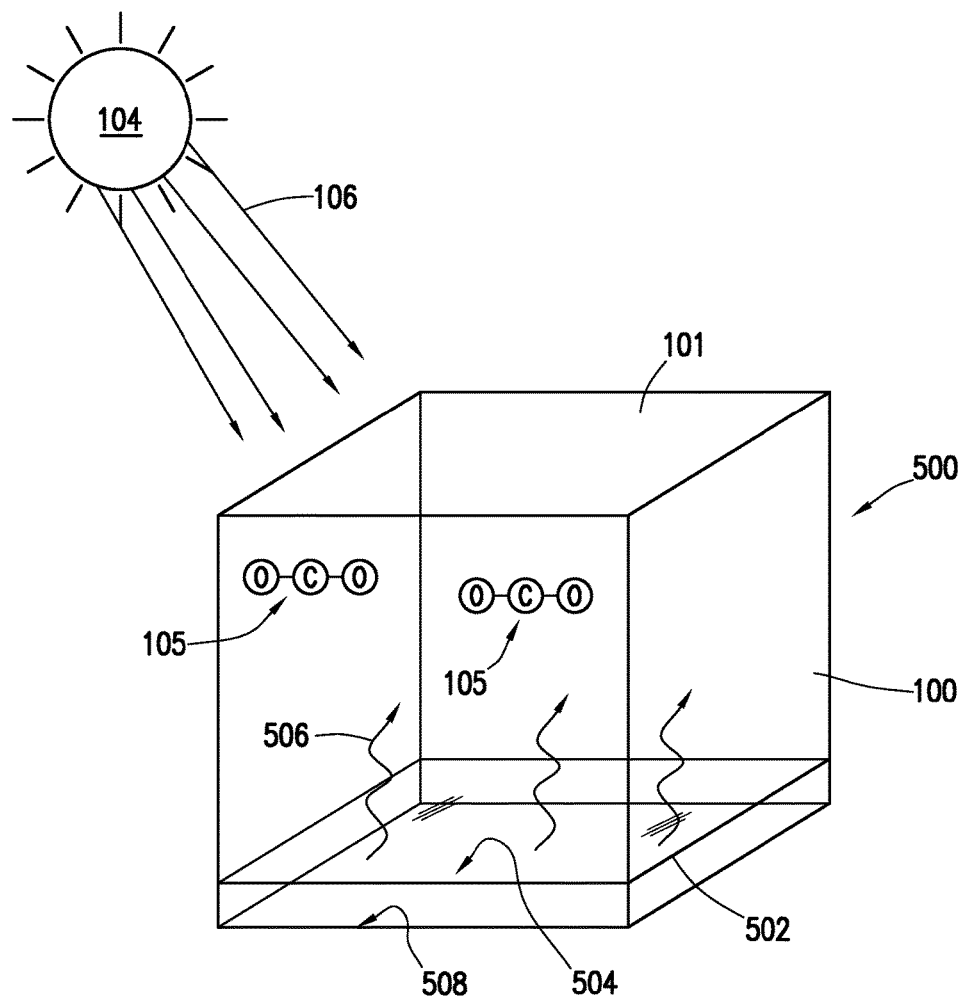
FIG. 5 shows a perspective view of a carbon dioxide heater in accordance with at least some embodiments.

Referring now to FIG. 5, in at least some embodiments, a carbon dioxide heater 500 may also include a thermal conversion plate 502 disposed within interior volume 101 of vessel 100. Thermal conversion plate 502 may be include upper surface 504 comprising a material or having a coating of a material, such as carbon black, suitable for absorbing incident radiation, and in particular, incident radiation in the visible portion of the spectrum. The absorbed radiation will be thermalized and the thermal conversion plate 502 may then act as a blackbody radiator, re-radiating the energy as thermal radiation 506. The thermal radiation 506 may have a spectrum that overlaps the aforementioned absorption bands of carbon dioxide. For example, thermal conversion plate 502 acting as a blackbody radiator at a temperature of 250° C. (523.15° K) has a blackbody spectral peak at about 5.5 µm. The carbon dioxide 105 within vessel 100 may then absorb and thermalize the radiation 506 from thermal conversion plate 502. In other words, the radiation absorbed by the carbon dioxide may be obtained by the action of thermal conversion plate 502 viewed as a wavelength "upconverter" converting the shorter wavelength visible radiation to longer wavelength infrared radiation. Any heating of the carbon dioxide may thus be supplemented by the thermally converted visible radiation. Of course, the temperature reached by the carbon dioxide 105 will be constrained by the laws of thermodynamics to be no higher than that reached by the thermal conversion plate 502. Conversely, if the temperature of the carbon dioxide from the direct absorption of infrared exceeds the temperature attained by the thermal conversion plate 502 from absorption of incident radiation, heat will flow to the thermal conversion plate until the temperatures equilibrate. Thermal conversion plate may comprise any material that will withstand the temperatures reached, but may typically be comprised of a metal such as aluminum, copper, steel, nickel, vanadium, manganese, magnesium and the like, and/or alloys of these metals. Thermal conversion plate 502 may be supported by the walls 101 vessel 100 away from the bottom 508 of vessel 100 to mitigate against heat loss through vessel 100 to the external environment. Alternatively, thermal conversion plate 502 may be supported above bottom 508 of vessel 100 by thermally insulating standoffs, similar to standoffs 306 in FIG. 3 (and not shown in FIG. 5).

Figure 6:
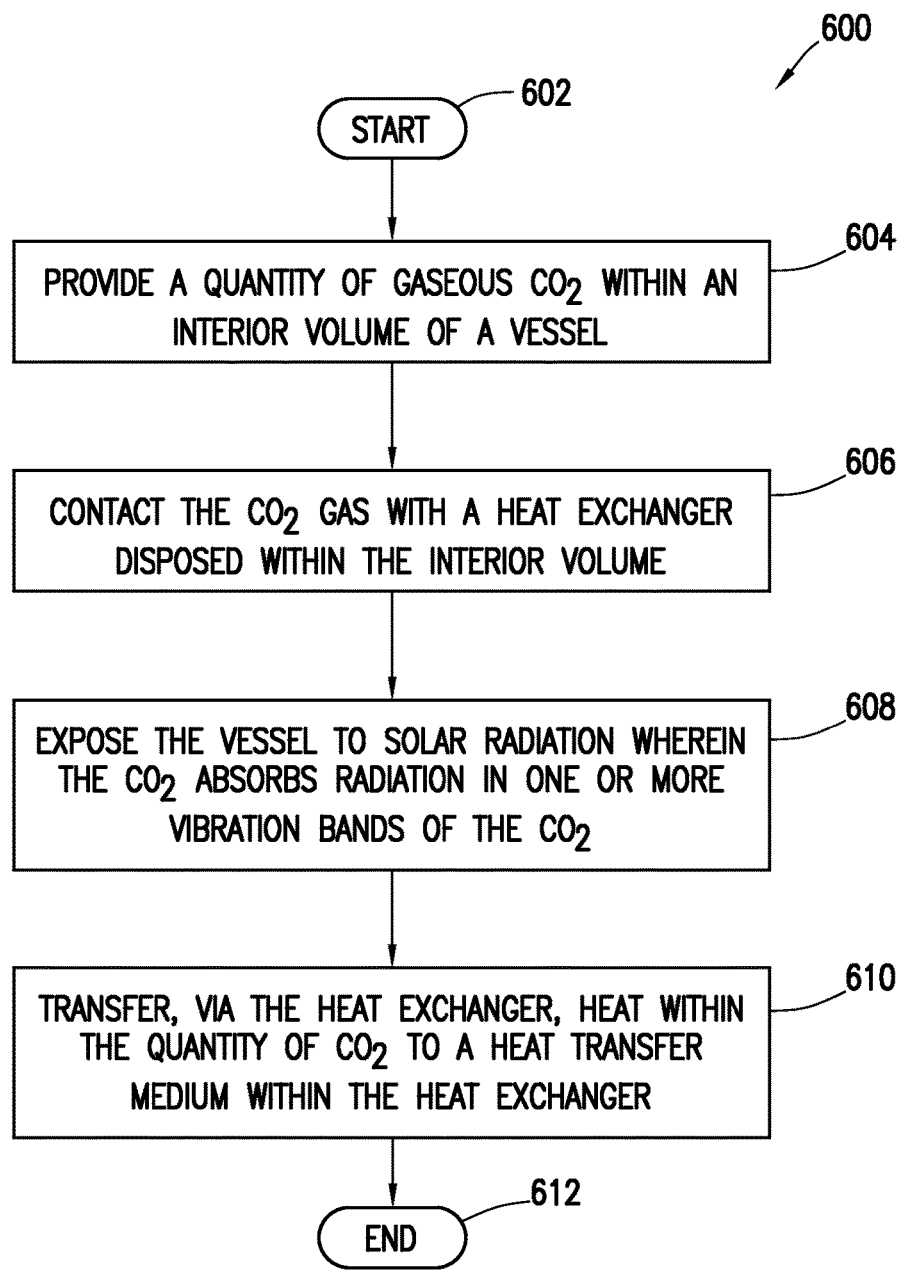
FIG. 6 shows a flowchart of a method in accordance with at least some embodiments.

FIG. 6 illustrates a flowchart of a method 600 in accordance with at least some embodiments. Method 600 starts at block 602 and in block 604 a quantity of carbon dioxide ($CO_2$) is provided in gaseous form within an interior volume of an vessel. The $CO_2$ is contacted with a heat exchanger disposed within the interior volume of the vessel, block 606. In block 608, the vessel is exposed to solar radiation, wherein the $CO_2$ absorbs radiation in one or more vibration bands of the carbon dioxide, the absorbed radiation being obtained from the solar radiation. In block 610, heat within the quantity of carbon dioxide produced by collisional thermalization of the absorbed radiation is transferred, via the heat exchanger, to a heat transfer medium within the heat exchanger, the heat transfer medium being in fluid communication with an external environment of the vessel. Method 600 ends at block 612.

Figure 7:
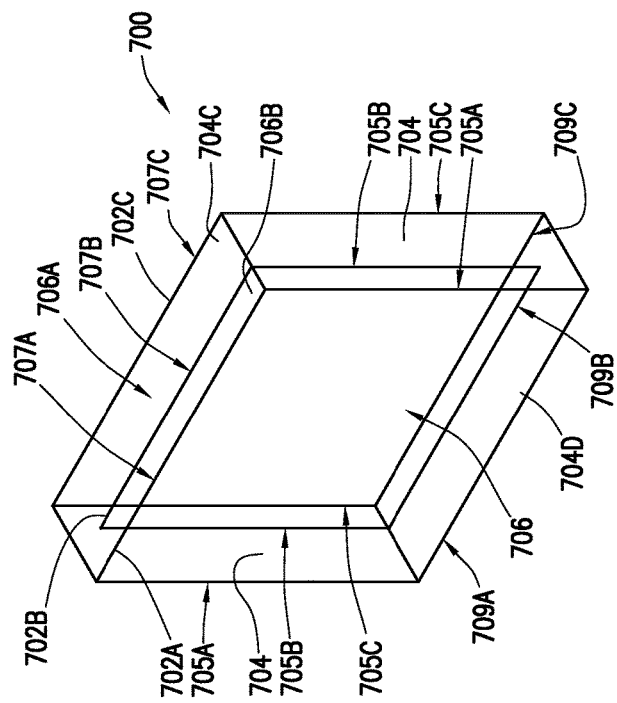
FIG. 7 shows a perspective view of an insulating apparatus in accordance with at least some embodiments.

In accordance with yet other embodiments, FIG. 7 illustrates a thermal insulating panel 700 comprising three panes of transparent thermally-insulating material, 702A, B and C. In at least some embodiments, panes 702A-C may be transparent in both the infrared and visible portions of the electromagnetic spectrum. Panes 702A-C may be disposed in a fixed, spaced-apart, substantially parallel relationship by first and edge members 704A, top edge member 704C and bottom edge member 704D. Edge member 704A and 704B may be joined to panes 702A-C at edges 705A-C, respectively. Top edge member 704C may be joined to panes 702A-C at respective edges 707A-C. And bottom edge member 704D may be joined to panes 702A-C at respective edges 709A-C In this way, panes 702A and 702C may define an interior volume divided into two interior volume portions 706A and 706B by pane 702B. One interior volume portion may be evacuated, that is, comprise a vacuum, and the other interior volume portion may be filled with an infra-red absorbing gas such as carbon dioxide. As will be described further below, either interior volume 706 may be evacuated and the other filled with carbon dioxide. Thermal insulating panel 700 may be, for example, installed in a window in a building. In such an embodiment, the interior volume 706 portion filled with carbon dioxide may be disposed facing the inside of the building while the evacuated interior volume 706 portion may concomitantly be disposed facing the external environment. In this way, the carbon dioxide may trap heat while the evacuated portion provides insulation between the carbon dioxide-filled portion and the external environment. Further, by disposing thermally insulating panel in such an exemplary window wherein it may be rotated by 180°, the disposition of the evacuated and carbon dioxide filled interior volume portions may be reversed in warm weather, placing the relatively cooler side of the thermally insulating panel 700 in thermal contact with the inside of the structure within which thermally insulating panel 700 is deployed. The application of thermally-insulating panel 700 to a window is exemplary and not limiting. Thus, in at least some other embodiments thermally insulating panel 700 may be used to form a portion of a wall, within the constraints imposed by mechanical construction and in still other embodiments may be incorporated in other structures such as roofs, skylights and the like.

References to "one embodiment", "an embodiment", "a particular embodiment", "some embodiments", "various embodiments", and "example embodiments" indicate that a particular element or characteristic is included in at least one embodiment of the invention. Although the illustrative phrases may appear in various places, these do not necessarily refer to the same embodiment.

The above discussion is meant to be illustrative of the principles and various embodiments of the present invention. Numerous variations and modifications will become apparent to those skilled in the art once the above disclosure is fully appreciated. For example, admixtures of carbon dioxide and other gases, such a methane, may be used to augment the infrared absorption bands available. It is intended that the following claims be interpreted to embrace all such variations and modifications.

What is claimed is:

1. A method comprising:
   providing a quantity of carbon dioxide in gaseous form within an interior volume of a vessel;
   wherein the vessel is comprised of walls transparent to infrared radiation; and
   contacting the carbon dioxide gas with a heat exchanger disposed within the interior volume of the vessel;
   exposing the vessel to solar radiation, wherein the carbon dioxide absorbs radiation in one or more vibration bands of the carbon dioxide, the absorbed radiation obtained from the solar radiation; and
   transferring, via the heat exchanger, heat within the first quantity of carbon dioxide produced by collisional thermalization of the absorbed radiation to a heat transfer medium within the heat exchanger and in fluid communication with an external environment of the vessel; and
   wherein the vessel comprises a fan disposed within the interior volume, the fan stirring the quantity of carbon dioxide within the interior volume of the vessel.

2. The method of claim 1 wherein the quantity of carbon dioxide comprises carbon dioxide having a density at standard temperature and pressure.

3. The method of claim 1 further comprising transferring heat within the thermal transfer medium to a space heating system within a structure.

4. The method of claim 1 further comprising transferring heat within the thermal transfer medium to a steam generator.

* * * * *